Dec. 20, 1927.
M. D. SMITH
1,653,441
SAFETY STOP SIGNAL
Filed Oct. 30, 1922
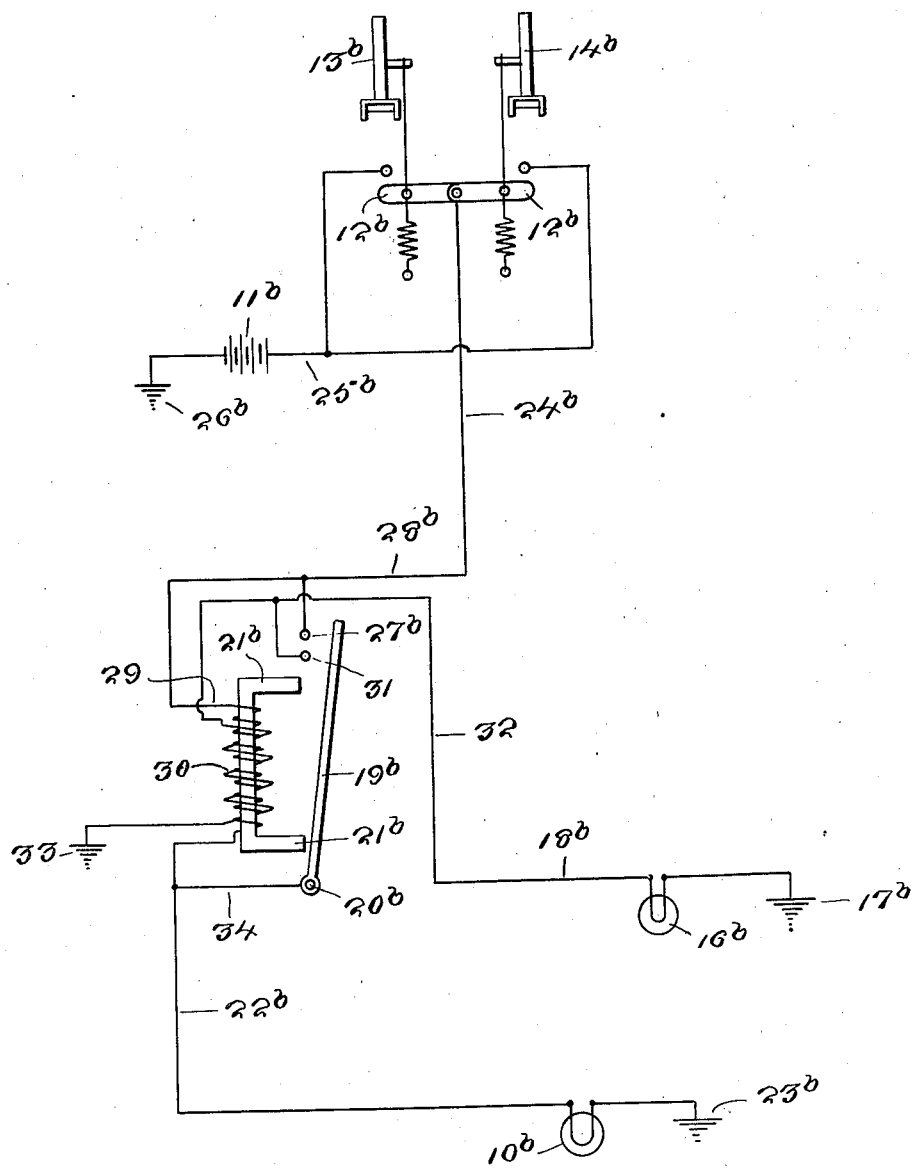
M. D. Smith
INVENTOR
BY Victor J. Evans
ATTORNEY
E. R. Rupport.
WITNESS:

Patented Dec. 20, 1927.

1,653,441

UNITED STATES PATENT OFFICE.

MYRL D. SMITH, OF NEW ORLEANS, LOUISIANA.

SAFETY STOP SIGNAL.

Application filed October 30, 1922. Serial No. 597,944.

This invention relates to signal devices for automobiles and the like, particularly to that type in which a stop signal at the back of the car is automatically illuminated when the clutch is thrown out or the brake applied preparatory to stopping and has for its object the provision of an electromagnetic relay which will automatically operate to energize a tell-tale or pilot lamp on the dash so that the operator will be immediately apprised of the fact in case the signal is not operating properly on account of a run down battery, broken wire or other defect.

With the above and other objects and advantages in view the invention consists in the details of construction to be hereinafter more fully described and claimed and illustrated in the accompanying drawings, in which:

The figure is a diagram illustrating the invention.

Referring more particularly to the drawings the numeral $10^b$ designates the signal lamp of a signal device located at the back of a vehicle and associated with a control mechanism which includes a storage battery $11^b$ and control switches $12^b$ connected with the clutch pedal $13^b$ and brake pedal $14^b$ whereby the switches will be closed to energize the signal lamp in the device $10^b$ when the clutch is thrown out or the brake applied preparatory to stopping the vehicle. This arrangement is old and well known but has the great objection that in case the bulb of the signal burns out, or if any other defect occurs, there is nothing to apprise the operator of this fact and he continues on his way ignorant of the true state of affairs and believing that his signal is operating properly when in fact it is not. Such a state of affairs is of course dangerous as the drivers of following vehicles see no signal and are very apt to run into the car.

It is with these facts in view that I have provided the tell-tale mechanism which includes a suitable socket mounted upon the dash or other convenient location and carrying a low candle power bulb $16^b$. One terminal of the socket is grounded at $17^b$ while the other terminal is connected by a wire $18^b$ with an armature $19^b$ which is pivoted at $20^b$ and which is disposed to be attracted by an electromagnet $21^b$.

The electro-magnet $21^b$ is provided with separate windings 29 and 30, the former of which is the exciting coil and the latter of which is the main coil. Both switch members $12^b$ are connected by the wire $24^b$ with one terminal of the exciting coil 29 which has its other terminal connected by the wire $22^b$ with the signal lamp $10^b$. The numeral $27^b$ designates a contact connected with the second mentioned terminal of the coil 29. I also provide an extra contact 31 connected with a wire 32 which leads from the tell-tale lamp $16^b$ to one terminal of the main winding 30. The other terminal of this main winding is grounded as shown at 33. The movable armature arm $19^b$ is connected by a wire 34 with the wire $22^b$ which connects between the winding 29 and the main signal device $10^b$.

In the operation of this form it will be seen that when either the clutch or foot brake lever is moved preliminary to stopping the vehicle and the corresponding switch $12^b$ is closed, current will flow through the wire $24^b$ and exciting coil 29 so that while the lamp $10^b$ is energized the magnet will also be energized to attract the armature arm $19^b$. When this arm engages the contact 31, current will pass through the wire 34, arm 19, contact 31, wire 32, and lamp $16^b$, to the ground $17^b$. The energization of this lamp $16^b$ will reveal whether or not the circuit is broken at any point. In addition to engaging the contact 31, the arm $19^b$ also engages the contact $27^b$, thereby shortcircuiting the exciting coil 29 while permitting the coil 30 to remain energized. The advantage of this is that the arm $19^b$ will be held by the electromagnet while permitting more current to pass through the signal lamp and effect more brilliant illumination thereof.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

In combination with a signal system for motor vehicles including a signal device, a source of current, and a pair of switches in circuit with said source of current and signal device; a tell-tale lamp, an electro-magnet having separate windings, one winding being connected with said switches and signal lamp and the other winding being connected with the tell-tale lamp and the ground, a pair of contacts, one of which is connected in the circuit between the switches and the first mentioned winding and the other of which is connected to the circuit between the tell-tale lamp and the second named winding, and a pivoted armature located adjacent the electro-magnet, and connected with that terminal of said first named winding which is connected to the signal device, said armature being attractable by the electro-magnet whereby to engage both contacts and thereby shunt said first named winding out of the signal device circuit and connect the second named winding and the lamp in the circuit.

In testimony whereof I affix my signature.

MYRL D. SMITH.